United States Patent [19]
Apfel

[11] Patent Number: 6,026,159
[45] Date of Patent: *Feb. 15, 2000

[54] INTEGRATED RINGER FOR SHORT TELEPHONE LINES

[75] Inventor: Russell J. Apfel, Austin, Tex.

[73] Assignee: Advanced Micro Devices, Inc., Sunnyvale, Calif.

[ * ] Notice: This patent is subject to a terminal disclaimer.

[21] Appl. No.: 08/982,541

[22] Filed: Dec. 2, 1997

Related U.S. Application Data

[63] Continuation of application No. 08/406,187, Mar. 16, 1995, Pat. No. 5,694,465.

[51] Int. Cl.$^7$ .................................................. H04M 11/00
[52] U.S. Cl. ......................... 379/377; 379/382; 379/398; 379/399
[58] Field of Search ..................................... 379/377, 382, 379/398, 399, 394, 350, 383, 385, 386, 3, 12, 15, 34; 324/509, 510, 525, 526

[56] References Cited

U.S. PATENT DOCUMENTS

| | | | |
|---|---|---|---|
| 3,919,488 | 11/1975 | Acevedo et al. | 379/197 |
| 4,455,456 | 6/1984 | Cochran | 379/351 |
| 4,456,991 | 6/1984 | Chea, Jr. et al. | 370/58 |
| 4,540,853 | 9/1985 | Albouy | 379/378 |
| 4,731,827 | 3/1988 | Wood | 379/377 |
| 4,742,536 | 5/1988 | Dewenter et al. | 379/97 |
| 4,797,917 | 1/1989 | Pasetti et al. | 379/253 |
| 4,827,503 | 5/1989 | Takato et al. | 379/373 |
| 4,847,896 | 7/1989 | Siligoni et al. | 379/253 |
| 4,961,219 | 10/1990 | Patel | 379/398 |
| 5,138,658 | 8/1992 | Carter et al. | 379/413 |
| 5,293,420 | 3/1994 | Nagato | 379/382 |
| 5,333,192 | 7/1994 | McGinn | 379/399 |
| 5,406,623 | 4/1995 | Rovik | 379/382 |
| 5,577,114 | 11/1996 | Morita et al. | 379/377 |
| 5,694,465 | 12/1997 | Apfel | 379/382 |

FOREIGN PATENT DOCUMENTS 8103728 12/1981 WIPO .

*Primary Examiner*—Forester W. Isen
*Assistant Examiner*—Jacques M. Saint-Surin
*Attorney, Agent, or Firm*—Foley & Lardner

[57] ABSTRACT

The invention provides an apparatus for use with a subscriber line interface circuit in a telephone system, the subscriber line interface circuit being interposed between a telephone central office and a subscriber line, the subscriber line being coupled with a subscriber telephone device. The apparatus comprises an interface circuit for coupling the apparatus with the subscriber line; a ringing generator coupled with the interface circuit for providing a time varying signal to the subscriber line in response to a received ring signal; a detector circuit coupled with the interface circuit for detecting an impedance of the subscriber line in the presence of the time varying signal and providing a detect indication when the impedance is below a predetermined impedance threshold; and a control circuit coupled with the ringing generator and with the detector circuit for providing the ring signal to the ringing generator and receiving the detect indication from the detector circuit, the control circuit interrupting the ring signal in response to receiving the detect indication. The apparatus provides balanced ringing signals to the subscriber telephone device and detects loop AC impedance to provide ring trip detection.

9 Claims, 3 Drawing Sheets

INTEGRATED RINGER FOR SHORT TELEPHONE LINES

CROSS REFERENCE TO RELATED APPLICATIONS

This application is a continuation of application Ser. No. 08/406,187 filed on Mar. 16, 1995 (now U.S. Pat. No. 5,694,465). Applicant claims the benefit under 35 U.S.C. § 120 of application Ser. No. 08/406,187, insofar as the subject matter of each of the claims of the instant application is not disclosed in the prior application in the manner provided by in 35 U.S.C. § 112, first paragraph.

TECHNICAL FIELD OF THE INVENTION

The present invention generally relates to an apparatus for use with a subscriber line interface circuit in a telephone system. More particularly, the present invention relates to a method and apparatus for providing a time varying ringing signal to the subscriber line, the subscriber line being coupled with a subscriber telephone device, the subscriber telephone device generating a ringing indication in response to the time varying ringing signal. The invention still further relates to an apparatus for detecting an off hook state of the subscriber line device, and interrupting the time varying ringing signal in response to the off hook detection.

BACKGROUND OF THE INVENTION

A telephone system generally includes one or more subscriber telephone devices, each subscriber telephone device being coupled with a telephone central office by a subscriber line. The subscriber telephone devices may be telephones or other telephone equipment. The telephone central office handles switching of telephone signals between subscriber telephone devices. Industry standards govern the electrical signal levels used for switching, coupling and signaling within the telephone system.

When a telephone call is placed to a particular subscriber telephone device, the telephone central office must send signals to the telephone device to indicate the incoming call. The telephone central office sends ringing signals which cause the subscriber telephone device to generate a ringing indication. The ringing indication may be a ringing bell, an electronic tone or some other audible or visible indication of ringing. The telephone central office applies the ringing signals directly to the subscriber telephone line.

Each subscriber telephone device is coupled to the telephone central office by a subscriber line. The subscriber line generally includes two conductors, one labeled "tip" and the other labeled "ring." Tip conductors and ring conductors carry both AC (time varying) and DC signals. The subscriber telephone device plus, the associated tip and ring conductors is commonly known as a loop or subscriber loop.

The subscriber telephone device can be modeled electrically as a resistor, an inductor and a capacitor in series and selectively coupled by a switch to the tip and ring conductors. The switch is known as the hook switch. When the telephone is on hook, and not in use, the hook switch couples the resistor-inductor-capacitor combination between the tip and ring conductors. When the telephone is off hook, or in use, the switch couples the tip and ring conductors through a resistor only. By detecting the D.C. impedance between the tip and ring conductors, the telephone central office can determine whether the subscriber telephone device is off hook (in use) or on hook (not in use).

When providing ringing signals to an intended receiving subscriber telephone device in response to a call originated by another (call originating) subscriber telephone device, the telephone central office must be able to determine whether the intended receiving subscriber telephone device is on hook or off hook for several reasons. First, if the intended receiving subscriber telephone device is off hook, the telephone central office must not send ringing signals, but must rather send a busy tone to the call originating subscriber telephone device. Secondly, if a user answers the phone by taking the receiving subscriber telephone device off hook in response to the ringing signal, the telephone central office must detect the change from on hook to off hook so that the receiving telephone does not ring loudly in the user's ear, causing the user discomfort. Further, in response to the receiving telephone going off hook, the telephone central office completes the connection between the call originating telephone device and the receiving subscriber telephone device. The process of providing ringing signals and detecting the on hook or off hook state of the receiving subscriber telephone device by the telephone central office is known as ring trip detection.

There are numerous industry standards governing ring trip detection. The telephone central office, or other equipment providing the ringing signals to the subscriber lines, must detect that the receiving subscriber telephone device has gone off hook and terminate the ringing signals within a predetermined time period, such as 200 msec. Further, the telephone central office or other device which provides ringing signals to the subscriber line must be able to provide a ringing indication to any telephone coupled to the subscriber line. The telephone central office or other device providing the ringing signals should provide no false ring trip detections and should not miss any ring trip detections. Still further, the device which provides the ringing signals to the subscriber line must work with any length phone line, including both short (low impedance) or long (high impedance) subscriber lines.

Short subscriber lines couple the telephone central office to subscriber telephone devices which are physically near the central office, perhaps just a few blocks away. Long subscriber lines couple the telephone central office to subscriber telephone devices which are physically distant from the central office, perhaps miles away. Long subscriber lines have a greater impedance, measured from the central office, than short subscriber lines. Long subscriber lines are also more susceptible to noise due to coupling from adjacent noise sources such as other subscriber lines and power lines, than are short subscriber lines.

One industry standard requires the ringing signal to be applied as an AC voltage with a DC offset. The AC voltage, measured at the telephone central office, is preferably a 90 volt rms, 20 Hz, AC signal in order to provide at least 40 volts vms at the receiving telephone device. The DC offset is preferably 48 volts, measured at the central office. The ringing signal is generally applied as an unbalanced or single-ended ringing signal. That is, the AC signal is applied to either the tip conductor or the ring conductor with either polarity of DC offset (referred to as ring-plus, ring minus, tipplus and tip-minus ringing). The conductor to which the AC and DC ringing signals are not applied is grounded in an unbalanced ringing design. The goal when applying ringing signals is to place the 90 volt rms AC signal across the tip and ring conductors.

When the subscriber telephone device is on hook, no DC path exists in the subscriber telephone device to permit DC current to flow in response to the applied DC offset voltage. However, with the telephone on hook, alternating current may flow in response to the applied AC ringing voltage to cause the subscriber telephone device to generate a ringing indication. When the subscriber telephone device is taken off hook, a DC path is established to couple the tip and ring conductors and allow DC current to flow in the loop. The central office detects the flow of the DC current in the loop to determine that the subscriber telephone device has been taken off hook and interrupts the ringing signal. Thus, prior art telephone apparatus have detected ring trip by detecting the DC impedance between the tip and ring conductors, typically by measuring DC current flow in response to a known applied DC voltage.

Application of the 90 volt rms signal and the 48 volt DC offset to the subscriber line means that the ringing generator must be able to handle potential differences substantially equal to 250 volts. It has heretofore been uneconomical to fabricate a ringing generator using a silicon integrated circuit.

Silicon integrated circuits which can handle 250 volts are expensive. Individual circuit elements, such as transistors, resistors and capacitors, designed to handle such large voltages must be physically large in order to sink and source the large currents associated with such large voltages. This large size requires substantial "real estate" on the surface of an integrated circuit which reduces the scale of integration of such devices as well as reducing manufacturing yield. Both the large size and the reduced yield increase manufacturing cost.

Moreover, circuit elements which can handle up to 250 volts must be fabricated using a manufacturing process designed to produce devices having junction breakdown potentials in excess of this voltage. Devices with smaller junction breakdown potentials will not function properly and may be permanently damaged when subjected to such large voltages. Manufacturing processes for silicon devices of the type commonly used for logic and control functions do not provide sufficient junction breakdown potentials to handle such large voltages, so logic and control circuitry cannot be readily integrated with telephone ringing signal transmitting circuitry. This further increases manufacturing cost of the overall system.

Where a central telephone office must generate ringing signals, the 250 volt requirement is not prohibitive. The telephone central office may be coupled with many thousands of subscriber lines. A single ringing generator is needed to provide ringing signals to these many subscriber lines. Thus, the high cost of the equipment needed to generate the 250 volt ringing signals is shared by the many thousands of subscriber lines.

However, modern telephone systems are moving away from systems in which a central office supplies many thousands of subscriber lines directly. Rather, in modern systems the telephone central office is coupled by an optical fiber to an optical network unit (OKU). The ONU couples the digital signals carried by the optical fiber with the analog electrical signals carried by the subscriber line to the subscriber telephone device. A relatively small number of subscriber lines are coupled to the ONU, perhaps one to ten. The ONU is located physically close to the subscriber telephone devices serviced by this small number of subscriber lines, preferably in the same city neighborhood as the subscriber telephone devices. This is known as a fiber in the loop (FITL) system. In a FITL system, each ONU must be capable of generating ringing signals. Ringing signals are not carried on the fiber optic line; the fiber optic line only transmits a ring command from the central office to the ONU. In response to the ring command, the ONU must generate the appropriate ringing signal on the appropriate analog subscriber line. Because only one or a very few subscriber lines are coupled to an ONU, the high cost of a ringing generator capable of supplying 250 volts cannot be shared among a large number of subscriber lines, as was the case in the prior art central office telephone system. However, since the ONU is physically close to the subscriber telephone devices which it services, the ONU must only provide analog signals to a short subscriber line, which may be only a few city blocks in length.

Accordingly, there is a need in the art for an apparatus and method for generating ringing signals requiring a total voltage less than 250 volts and which will cause a subscribe telephone device to produce a ringing indication. Further, there is a need in the art for an apparatus and method for generating ringing signals using only a silicon device coupled with the subscriber line. Still further, there is a need in the art for an apparatus and method for detecting ring trip using a silicon device.

SUMMARY OF THE INVENTION

The invention provides a method for providing ringing signals to a subscriber telephone device coupled to a subscriber line, the subscriber line including a first conductor and a second conductor. The method includes the steps of providing a first time varying signal to the first conductor and a second time varying signal to the second conductor; detecting an AC impedance between the first conductor and the second conductor in the presence of the first time varying signal and the second time varying signal; and providing a ring trip indication when the AC impedance is below a predetermined threshold.

The invention further provides an apparatus for use with a subscriber line interface circuit in a telephone system, the subscriber line interface circuit being interposed between a telephone central office and a subscriber line, the subscriber line being coupled with a subscriber telephone device. The apparatus comprises an interface means for coupling the apparatus with the subscriber line; a ringer means coupled with the interface means for providing a time varying signal to the subscriber line in response to a received control signal; and detect means coupled with the interface means for detecting an impedance of the subscriber line in the presence of the time varying signal and providing a ring trip indication when the impedance is below a predetermined impedance threshold.

The invention further provides an apparatus for coupling a subscriber line with a digital signal path in a telephone system, the apparatus receiving information including a ring command from the digital signal path, the subscriber line being coupled with a subscriber telephone device. The subscriber device includes signal means and hook switch means. The subscriber line has a first conductor and a second conductor and the hook switch means has a first state for coupling the first conductor with the second conductor and a second state for decoupling the first conductor and the second conductor. The signal means generates a ringing indication in response to a ringing signal on the subscriber line when the hook switch means is in the second state. The apparatus comprises interface means for coupling the apparatus with the subscriber line; ringer means coupled with the interface means for providing the ringing signal to the subscriber line, the ringing signal preferably including only a first time varying signal and a second time varying signal, the ringer means providing the first time varying signal and the second time varying signal in response to the ring command. The apparatus further includes detect means coupled with the interface means for detecting an AC impedance between the first conductor and the second conductor in the presence of the ringing signal, the AC impedance having a first value when the hook switch has its first state and a second value when the hook switch has its second state, the detect means providing a ring trip indication when the AC impedance has one of the first value and the second value. The interface means, the ringer means, the detect means are preferably integrated in a common integrated circuit.

The invention still further provides an apparatus for use with a subscriber line interface circuit in a telephone system, the subscriber line interface circuit being interposed between a telephone central office and a subscriber line, the subscriber line being coupled with a subscriber telephone device and having a first conductor and a second conductor. The apparatus comprises a first interface circuit coupled with the subscriber line; a second interface circuit coupled with the telephone central office and receiving a ring command from the telephone central office; a ringing generator coupled with the first interface circuit, the ringing generator providing a first ringing signal to the first conductor and a second ringing signal to the second conductor in response to the ring command, the first ringing signal and the second ringing signal being balanced, time varying signals. The apparatus further comprises an impedance detector coupled with the first interface circuit, the impedance detector detecting an AC impedance between the first conductor and the second conductor in the presence of the first ringing signal and the second ringing signal, the impedance detector providing a ring trip indication when the impedance is below a predetermined impedance threshold. The first interface circuit, the second interface circuit, the ringing generator and the impedance detector are preferably integrated in a common integrated circuit, and the subscriber telephone device produces a ringing indication in response to the first ringing signal and the second ringing signal.

The invention still further provides an improved subscriber line interface circuit for coupling to a subscriber line. The subscriber line is coupled with a subscriber telephone device, the subscriber line having a first conductor and a second conductor. The subscriber line interface circuit includes a first interface circuit coupled with the subscriber line; a second interface circuit coupled with the telephone central office and receiving a ring command from the telephone central office; a ringing generator coupled with the first interface circuit, the ringing generator providing a first ringing signal to the first conductor and a second ringing signal to the second conductor in response to the ring command, the first ringing signal and the second ringing signal being balanced, time varying signals; and an impedance detector coupled with the first interface circuit, the impedance detector detecting an AC impedance between the first conductor and the second conductor in the presence of the first ringing signal and the second ringing signal, the impedance detector providing a ring trip indication when the impedance is below a predetermined threshold. The first interface circuit, the second interface circuit, the ringing generator and the impedance detector are integrated in a common integrated circuit. The subscriber telephone device produces a ringing indication in response to the first ringing signal and the second ringing signal.

It is therefore an advantage of the present invention to provide an apparatus and method for use in a subscriber line interface circuit which generates ringing signals for a subscriber telephone device and detects an off hook state of the subscriber telephone device.

A further advantage of the present invention is to provide ringing signals at a lower total voltage, relative to the prior art.

Yet a further advantage of the present invention is to provide a ringing generator which may be economically integrated in a silicon integrated circuit.

Yet a further advantage of the present invention is to provide ringing signals capable of ringing any telephone within the constraints of industry standards.

Further advantages and features of the present invention will be apparent from the following specification and claims when considered in connection with the accompanying drawing illustrating the preferred embodiment of the present invention.

BRIEF DESCRIPTION OF THE DRAWINGS

For purposes of clarity and ease in understanding the present invention, like elements will be identified by like reference numerals in the various drawings.

DETAILED DESCRIPTION OF ILLUSTRATED EMBODIMENT

Figure 1:
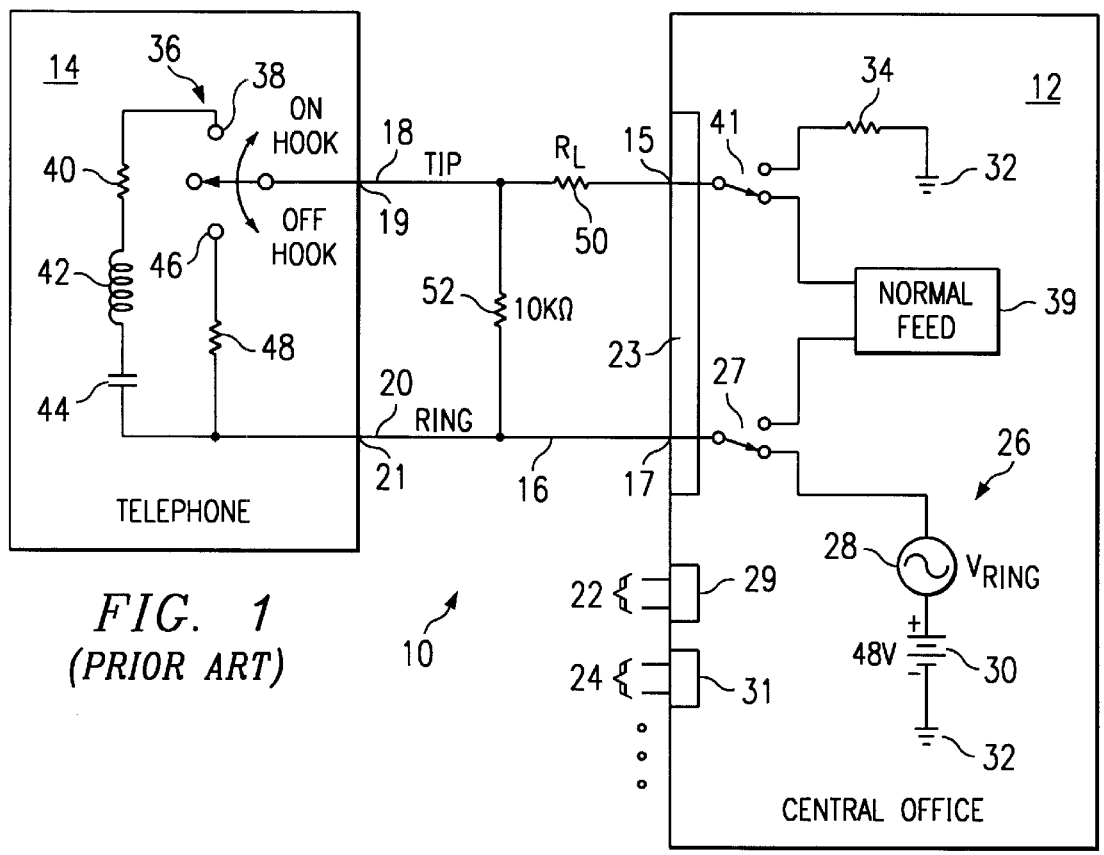
FIG. 1 is a schematic block diagram illustrating a prior art central office telephone system.

FIG. 1 is a schematic block diagram illustrating a prior art central office telephone system 10. The central office telephone system 10 includes a telephone central office 12 and at least one subscriber telephone device 14. The subscriber telephone device 14 is coupled to the central office 12 by a subscriber line 16, the subscriber line 16 including a tip conductor 18 and a ring conductor 20.

The telephone central office 12 controls switching of telephone calls placed between the subscriber telephone device 14 coupled to the subscriber line 16 and other subscriber telephone devices coupled to other subscriber lines 22 and 24. In particular, to signal the presence of an incoming call to the subscriber telephone device 14, the central office 12 generates ringing signals on the subscriber line 16.

To generate ringing signals, the central telephone office 12 includes a ringing generator 26 coupled between the ring conductor 20 and the ground potential 32. The tip conductor 18 is also switchably coupled to ground potential 32 through a resistor 34. The telephone central office 12 is adapted to couple the ringing generator 26 to the other subscriber lines 22, 24 to provide an indication of an incoming call to subscriber lines 22, 24.

The telephone central office 12 includes switches 27, 41 for selectively coupling the subscriber line 16 to either the ringing generator 26 or a normal telephone signal feed circuit 39. The normal feed circuit 39 communicates telephone signals, rather than ringing signals, with the subscriber 35 telephone device 14. To convey ringing signals to the subscriber telephone device 14, the switch 27 decouples the normal feed circuit 39 from the ring conductor 20 and couples the ringing generator 26 to the subscriber line 16 and the switch 41 decouples the normal feed circuit 39 from the tip conductor 18 and couples the tip conductor 18 to ground potential 32 through resistor 34.

The telephone system 10 includes a subscriber line interface circuit 23 coupled with the subscriber line 16 at terminals 15 and 17. The subscriber line interface circuit 23 may be located at the central telephone office 12, as illustrated in FIG. 1, or may be physically remote from the central telephone office in a private area branch exchange (PABX), as is known in the art. The subscriber line interface circuit 23 preferably couples the high-voltage analog subscriber line 16 to lower voltage analog and digital circuits in the central telephone office 12. Preferably the subscriber line interface circuit 23 supports the "BORSHT" functions (Battery feed, Over-voltage protection, Ringing signal, Supervision of the subscriber line 16, Hybrid two-wire to four-wire conversion, and Test). The telephone system 10 also includes subscriber line interface circuits 29, 31 coupled with the subscriber lines 22, 24, respectively.

The subscriber telephone device 14 includes a hook switch 36 for coupling the tip conductor 18 with the ring conductor 20 at terminals 19 and 21, respectively. The hook switch 36 generally has a first state and a second state for selectively coupling the tip conductor 18 and the ring conductor 20. In its on hook state, the hook switch 36 couples the tip conductor 18 to a terminal 38. In the on hook state, the tip conductor is thus coupled to the ring conductor through a resistor 40, an inductor 42. In its off hook state, the hook switch 36 couples the tip conductor 18 to a terminal 46. Thus, in the off hook state, the tip conductor 18 is coupled by the hook switch 36 through a resistor or DC impedance 48 to the ring conductor 20. When the subscriber telephone device 14 is not in use, the hook switch 36 has its first state and couples the tip conductor 18 to the terminal 38. When the subscriber telephone device 14 is in use, the hook switch 36 has its second state and couples the tip conductor 18 with the terminal 46. Specific subscriber telephone devices may omit individual components such as the inductor 42 or the capacitor 44. In general, however, when any subscriber telephone device is on hook, little or no DC current flows in the subscriber line 16, and when any subscriber telephone device is off hook, DC current flows in the subscriber line 16.

In accordance with the prior art, the central telephone office 12 couples the ringing generator 26 to the ring conductor 20 through the switch 27 to supply ringing signals to the subscriber line 16. The ringing generator 26 includes an AC voltage source 28 and a DC offset voltage source 30. The ringing signals generated by the ringing generator 26 consist of an AC voltage generated by the AC voltage source 28 superimposed on a DC voltage generated by the DC offset voltage source 30. In accordance with the prior art and with industry standards, the AC voltage is typically a 20 Hz, 90 volt rms AC voltage and the DC voltage is a 48 volt DC voltage. The resulting waveform has amplitude peaks of +77 volts and −173 volts, centered about the DC offset voltage of −48 volts.

Thus, the ringing generator 26 in accordance with the prior art must be able to handle voltage amplitude ranges greater than 250 volts. Because of this large voltage requirement, prior art ringing generators have not been economically implementable in silicon integrated circuit devices. Silicon devices which can withstand 250 volts, without experiencing junction breakdown, are expensive to design and produce. Moreover, silicon manufacturing processes which may be able to handle 250 volts breakdown voltages are not readily combined with manufacturing processes for producing silicon logic circuits, such as may be used for implementing switching equipment used in the subscriber line interface circuit 23 by the central telephone office 12 or in a PABX.

The response of the telephone 14 to the prior art ringing signals depends on the state of the hook switch 36. When the hook switch 36 is on hook, coupling the tip conductor 18 to the terminal 38, the capacitor 44 blocks the flow of DC current from the DC off set voltage source 30. However, the AC current generated by the AC voltage source 28 is passed by the capacitor 44, and AC current flows through the loop, which includes the capacitor 44, the inductor 42, the resistor 40, the hook switch 36 and the resistor 34 in the central office 12. The subscriber telephone device 14 responds to this AC current by producing a ringing indication. For example, the inductor 42 might be the coil of a bell. The flow of the current in the loop causes the bell to ring in response to the ringing signals. Alternatively, if the subscriber telephone device 14 is an electronic telephone and does not include a bell with an inductive coil, the electronic telephone detects the AC voltage generated by the AC voltage source 28 or its associated AC current and produces a ringing indication in response thereto.

With the hook switch 36 in its second state, coupling the tip conductor 18 to the terminal 46, AC current and DC current generated by the DC offset voltage source 30 flows between the ring conductor 20 and the tip conductor 18 through the DC impedance 48. In accordance with the prior art, the central office 12 detected the flow of this DC current to determine that the hook switch 36 was in its off hook state and that the subscriber telephone device 14 was in use. This is known as ring trip detection. In response to a ring trip detection, the central office 12 interrupts the flow of the ringing signals to the subscriber telephone device 14 by opening the switch 27. Industry standards require that the ringing signals be interrupted within a predetermined time period following ring trip detection, for example, 200 msec.

The prior art central office telephone system 10 thus performs ring trip detection by examining the DC impedance of the subscriber line 16 at the terminals 15, 17 of the subscriber line interface circuit 23. This DC loop impedance also includes the impedance of the subscriber line 16 itself. The DC impedance is tested by measuring either current flow or voltage dropped by the subscriber line 16.

As shown in FIG. 1, the subscriber line 16 can be modeled as a loop resistance 50 in the tip conductor 18, and by a 10 K ohm resistor 52 between the tip conductor 18 and the ring conductor 20, representing worst case leakage resistance between the tip conductor 18 and the ring conductor 20. In worst case conditions, where the subscriber line 16 is very long, and the telephone 14 is located very distant from the subscriber line interface circuit 23, the loop resistance 50 may be as high as 1500 ohms. In accordance with industry standards, when the hook switch 36 is in its on hook state, the impedance seen across telephone terminals 19, 21 is substantially equal to 1 REN (Ringer Equivalent Number), where 1 REN is an impedance of 7000 ohms at 20 Hz. Further in accordance with industry standards, the telephone system 10 must function properly with up to five telephone devices such as subscriber telephone device 14 coupled to each subscriber line 16, 22, 24. Thus, in accordance with industry standards, the system 10 must function normally with up to 5 REN, or an impedance of 1400 ohms at 20 Hz. When the hook switch 36 has its off hook state, the impedance seen between the terminals 19 and 21 may be substantially 100 to 430 ohms.

The value of the loop resistance 50 (RL) is dependent on the length of the subscriber line 16, or the distance between the central office 12 and the subscriber telephone device 14. Where the subscriber telephone device 14 is physically near the central office 12 (a short subscriber line), the loop resistance 50 has a value of substantially 0 ohms. Where the subscriber telephone device 14 is distant from the central office 12 (a long subscriber line), the loop resistance 50 may be modeled with a value of substantially 1500 ohms.

An example of a short subscriber line is the analog subscriber line used in connection with a fiber in the loop (FITL) system. In such a system one or more fiber optic cables couple the telephone central office with an optical network unit (ONU). The ONU is located within the immediate vicinity of the subscriber telephone devices serviced by the ONU. The distance from the ONU to the subscriber telephone device in such a system is generally no more than a few city blocks. In contrast, an example of a long subscriber line is the central office telephone system 10 of FIG. 1, in which the subscriber line 16 may have a length on the order of miles. A central office telephone system may have a remote switching station coupling the subscriber telephone devices to the central office. Even in this case, long subscriber lines may be miles long.

The difference in impedances seen by the subscriber line interface circuit 23, between a high value when the subscriber telephone device 14 has its on hook state and a low value when the subscriber telephone device 14 has its off hook state, is useful for ring trip detection. Ring trip detection includes determining when a subscriber telephone device is off hook, so that no ringing signals are conveyed to the subscriber telephone device, and determining when a subscriber telephone device is taken off hook in response to ringing signals so that the ringing signals may be interrupted and a call connected. The high impedance of the on hook state and the low impedance of the off hook state may be detected in a variety of ways. One known way is to supply current to the subscriber line at a known ringing voltage. When the subscriber telephone device is on hook, the current will have a first value, and when the subscriber telephone device is off hook, the current will have a second, larger value. Ring trip detection occurs in response to detecting this change in current. The change in current is an indication of the change in impedance.

Table 1 illustrates AC and DC impedances for both the on hook state and off hook state of the hook switch 36, for both a short subscriber line such as subscriber line 16 and a long subscriber line such as subscriber line 16.

Table 1 shows that, for both long subscriber lines and short subscriber lines, the DC loop impedance detected by the subscriber line interface circuit 23 can be readily used to distinguish the off hook condition from the on hook condition of the hook switch 36. Even in the worst case situation, with a long subscriber line, the off hook DC impedance is at most substantially equal to 1900 ohms, and the on hook DC impedance is 10 K ohms. The subscriber line interface circuit 23 can distinguish the on hook and off hook DC impedances by setting a detection threshold in the middle of this broad range of DC loop impedance.

In contrast, Table 1 shows there is an overlap present in the AC loop impedances. In the long lines situation, the AC off hook impedance may be in the range of 1600 to 1900 ohms, which overlaps the possible range for the AC on hook impedance in the short lines situation, 1.4 K ohms to 7 K ohms. Because of this overlap, the AC impedance may not be used to reliably distinguish the on hook state of the hook switch 36 from the off hook state in a telephone system which involves both short subscriber lines and long subscriber lines. Thus, with the prior art systems such as central office telephone system 10 illustrated in FIG. 1, AC loop impedance cannot be used for ring trip detection. The ringing generator 26 must supply both AC and DC voltages, as discussed above, and the ringing generator 26, being required to accommodate a 250 volt range of voltage, may not be economically integrated with the subscriber line interface circuit 23.

Figure 2:
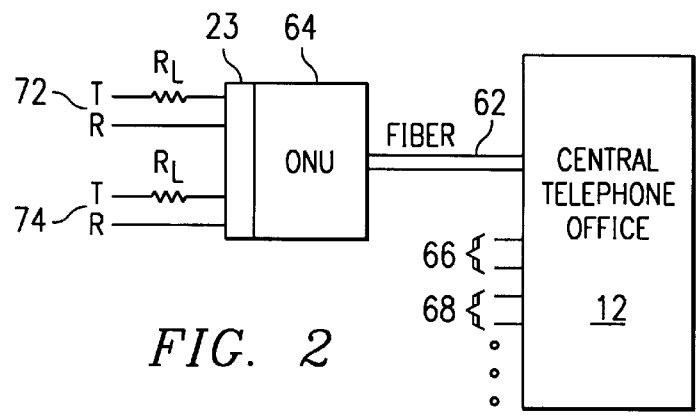
FIG. 2 is a schematic block diagram illustrating a fiber in the loop telephone system.

FIG. 2 shows a schematic block diagram illustrating a fiber in the loop (FITL) telephone system 60. In a FITL system, the central telephone office 12 is coupled by a fiber optic cable 62 to an optical network unit (OKU) 64. The central telephone office may also be coupled by other fiber optic cables 66, 68 to other optical network units. The central telephone office 12 communicates with the ONU 64 digitally, using light pulses conveyed over the fiber optic cable 62. The ONU 64 converts the light pulses to electrical signals. The ONU includes a subscriber line interface circuit 23 for coupling the electrical signals with one or more subscriber lines 72, 74. The subscriber lines 72, 74 may be coupled with telephone equipment such as subscriber telephone device 14 (FIG. 1). The subscriber lines 72, 74 convey analog electrical signals in a manner substantially identical to the subscriber line 16 illustrated in FIG. 1. For generating ringing signals and for effecting ring trip detection, the subscriber line interface circuit 23 must conform to the same industry standards imposed upon the prior art central office telephone system 10 of FIG. 1.

The ONU 64 generally serves four to eight subscriber lines and is physically located within a few city blocks of each of the associated subscriber line devices. By virtue of this close proximity, the worst case impedance for the subscriber lines 72, 74, RL, is 100 ohms in an FITL system. Table 2 shows AC and DC impedances for both off hook and on hook conditions in an FITL system.

TABLE 1

| | SHORT LINES (5 REN) | | LONG LINES (5 REN) | |
|---|---|---|---|---|
| | DC IMPEDANCE | AC IMPEDANCE | DC IMPEDANCE | AC IMPEDANCE |
| OFF HOOK | 100–400 Ω | 100–400 Ω | 1600–1900 Ω | 1600–1900 Ω |
| ON HOOK | 10 KΩ | 1. K–7 KΩ | 10 KΩ | 2.9 K–8.5 KΩ |

|  | SHORT LINES (5 REN) | | LONG LINES (5 REN) | |
| --- | --- | --- | --- | --- |
|  | DC IMPEDANCE | AC IMPEDANCE | DC IMPEDANCE | AC IMPEDANCE |
| OFF HOOK | 100–400Ω | 100–400Ω | 200–500Ω | 200–500Ω |
| ON HOOK | 10 KΩ | 1.4 K–7 KΩ | 10 KΩ 1.5 K–7 KΩ | |

From Table 2, it is apparent that in an FITL system, there is no AC impedance range overlap between the on hook, short line, situation and the off hook, long line situation. Thus, for an FITL telephone system, ring trip detection can be made by detecting only the AC impedance of the subscriber line 72, 74 seen by the subscriber line interface circuit 23. In accordance with the present invention, since AC signals are being used to detect subscriber line impedance and to generate ringing signals, no DC offset voltage need be generated by the ringing generator.

Elimination of the DC offset voltage generated by the ringing generator provides important advantages. The total voltage which must be accommodated by devices associated with the ringing generator is reduced. This allows the ringing generator to be economically implemented in a silicon integrated circuit. The silicon integrated circuit is only required to accommodate voltages as great as the 90 V rms ringing signal. Therefore, the silicon integrated circuit can be manufactured at reduced cost compared with integrated circuits which can accommodate voltages as large as the combination of the 90 V rms ringing voltage and a DC offset voltage. Implementing the ringing generator in a single silicon integrated circuit, preferably the same integrated circuit containing the subscriber line interface circuit 23, reduces the number of devices and the number of interconnections required. This, in turn, reduces cost and improves reliability of the system.

Since in short loop applications the load impedance is significantly larger than the line impedance, the attenuation of the ringing signal from the linecard to the subscriber equipment is small and the ringing voltage at the subscriber line interface circuit or linecard can be reduced. In general, the line card including the subscriber line interface circuit 23 must provide a ringing voltage that is large enough to provide a 40 V rms ringing signal at the telephone to ring the telephone. If the loop is 1500 ohms, a 94 V rms signal with a 400 ohm source impedance is required to provide 40 V rms to a 5 REN load at the end of the loop. However, if the loop impedance is 70 ohms and if the source impedance can be reduced to, for example, 100 ohms, then a source voltage of 45 V rms will provide 60V rms to a 5 REN load.

Figure 3:
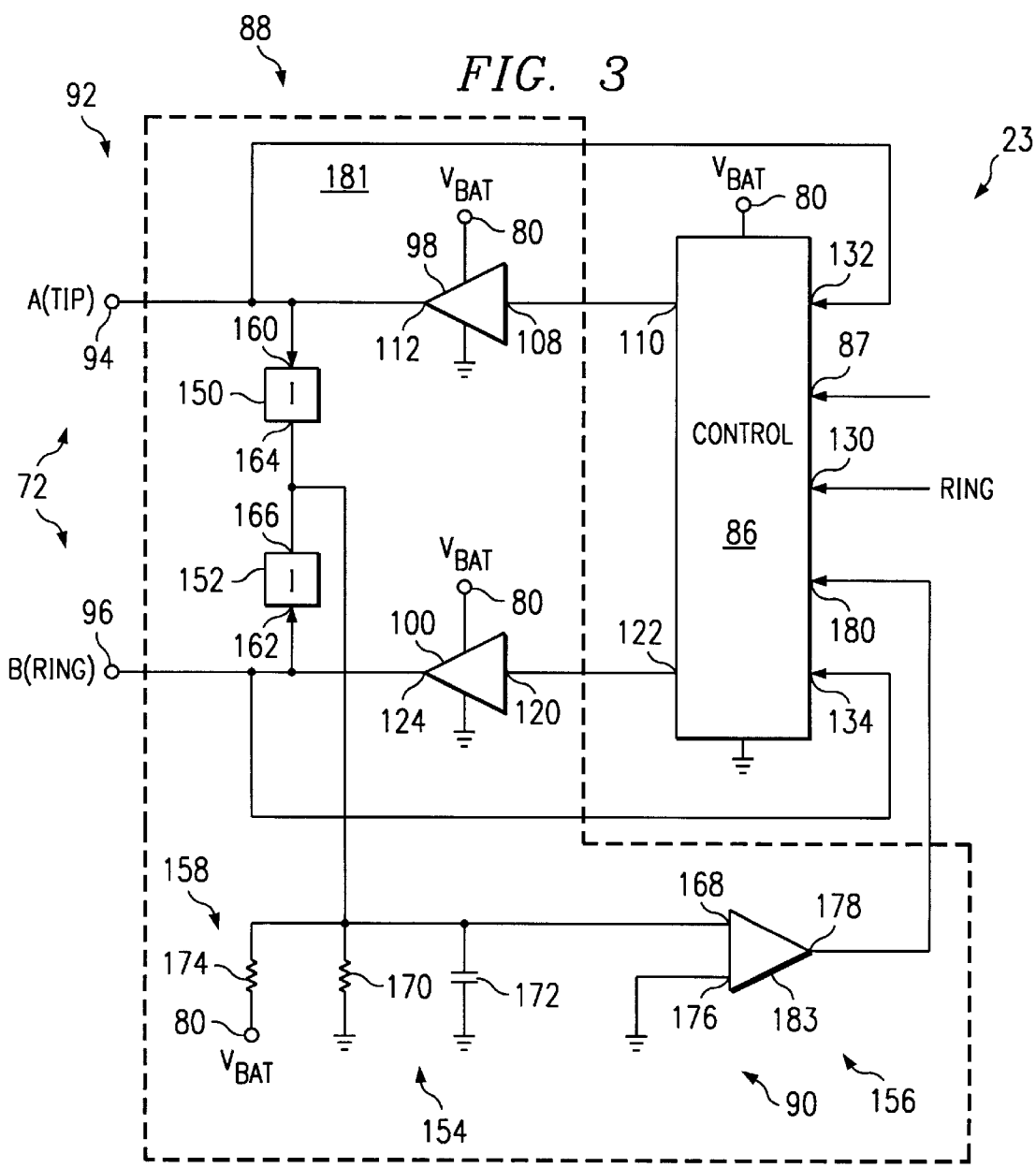
FIG. 3 is a schematic block diagram of a subscriber line interface circuit in which the apparatus of the present invention may be used.

FIG. 3 is a schematic block diagram of a subscriber line interface circuit 23 in which the apparatus of the present invention may be used. The subscriber line interface circuit 3 is coupled between a constant signal source 80 and ground potential. The constant signal source 80 preferably supplies a DC voltage to the subscriber line interface circuit 23. The constant signal source 80 is preferably a DC voltage known as the battery voltage which is supplied to the subscriber line interface circuit 23 from external to the subscriber line interface circuit 23. The battery voltage preferably has a value in the range −21 volts to −75 volts.

The subscriber line interface circuit 23 further includes a control circuit 86, a ringing generator 880, an impedance detector '90 and a subscriber line interface 92. The subscriber line interface 92 is adapted to be coupled to the subscriber line 72, including a tip conductor 94 and a ring conductor 96. The subscriber line interface 92 may include current limiting resistors and other interface components (not illustrated in FIG. 3). The subscriber line interface 92 thus forms an interface means for coupling the subscriber line interface circuit 23 with the subscriber line 72.

The ringing generator 88 includes a first amplifier 98 and a second amplifier 100. The first amplifier 98 and the second amplifier 100 are each coupled with the constant signal source 80 and to ground potential. The first amplifier 98 has an input 108 coupled with an output 110 of the control circuit 86. The first amplifier 98 has an output 112 coupled with the tip conductor 94. The second amplifier 100 has an input 120 coupled with an output 122 of the control circuit 86. The second amplifier 100 has an output 124 coupled with the ring conductor 96. The ringing generator 88 thus provides a ringer means for providing a time varying ringing signal to the subscriber line in response to a received control signal. The control circuit 86 has a ring input 130, a control input 87, a first feedback input 132 and a second feedback input 134. The control circuit 86 includes digital logic circuitry for controlling the operation of the subscriber line 20 interface circuit 23. The control circuit responds to commands received at control input 87. The first feedback input 132 is coupled to the tip conductor 94. The second feedback input 134 is coupled to the ring conductor 96. Preferably, the ring input 130 and the control input 87 are adapted to receive control signals having standard signal levels, such as CMOS signal levels.

In operation, the subscriber line interface circuit 23 receives command and control information conveyed from the central office 12 to inputs including the ring input 130 and the control input 87. The control circuit 86 receives the command and control information which may include a ring command directing the subscriber line interface circuit 23 to provide ringing signals to the subscriber line 72 and to detect for ring trip. In response to a ring command received at the ring input 130, the control circuit 86 provides control signals at outputs 110 and 122 which cause the first amplifier 98 and the second amplifier 100 to generate a first time varying signal and a second time varying signal, respectively. The first time varying signal and the second time varying signal are conveyed to the tip conductor 94 and the ring conductor 96, respectively.

Figure 4:
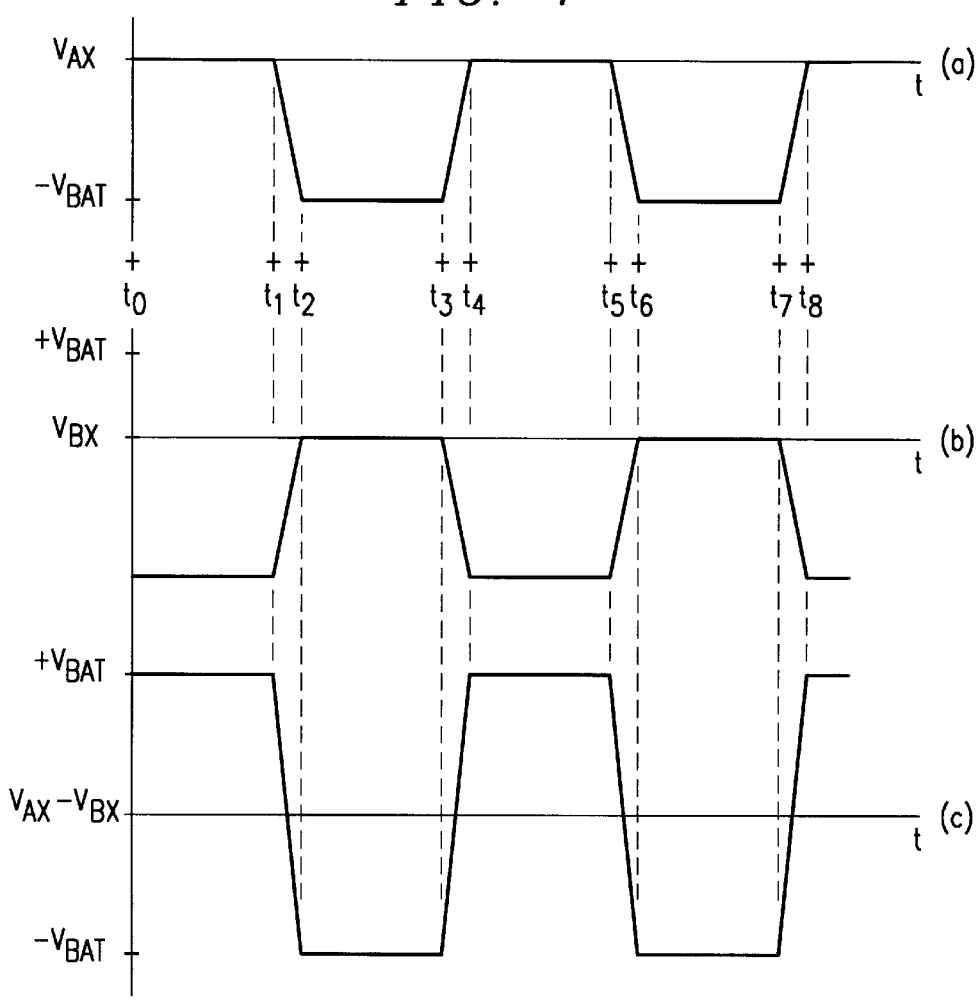
FIG. 4 is a diagram illustrating ringing signal voltage waveforms generated by the apparatus of FIG. 3.

In accordance with the present invention, the first time varying signal conveyed by the tip conductor 94 and the second time varying signal conveyed by the ring conductor 96 are balanced, time varying signals. That is, the first time varying signal and the second time varying signal have substantially equal amplitudes of substantially opposite polarity. FIG. 4 is a diagram illustrating ringing signal voltage waveforms generated by the apparatus of FIG. 3. FIG. 4 (a) is a diagram of a waveform representing the first time varying ringing signal generated at the tip conductor 94 by the first amplifier 98. FIG. 4 (b) is a diagram of a second time varying ringing signal generated at the ring conductor 96 by the second amplifier 100. In FIG. 4(a), during a first phase defined by the time intervals $t_3$-$t_2$, $t_8$,-$t_7$, etc., the waveform has an amplitude substantially equal to the absolute value of the battery voltage VBAT provided by the constant signal source 80. In FIG. 4 (b), during a second phase defined by the time intervals $t_1$-$t_0$ $t_5$-$t_4$, etc., the waveform provided to the ring conductor 96 has an amplitude substantially equal to the absolute value of the battery voltage VBAT provided by the constant signal source 80. Over a predetermined time period, the amplitude of the first waveform and the amplitude of the second waveform, measured at each instant in time, sum to a predetermined constant level. The first waveform and the second waveform thus represent balanced signals. Preferably, non-zero time intervals defined by the time intervals $t_2$-$t_1$, $t_4$-$t_3$, $t_5$-$t_6$, $t_8$-$t_7$, etc., are provided during which the polarities of the first and second time varying signals are switched. The first time varying signal and the second time varying signal preferably have a frequency of 20 Hz to conform with industry standards for ringing signals.

Referring again to FIG. 3, while the first time varying signal supplied to the tip conductor 94 and the second time varying signal supplied to the ring conductor 96 may be generated by any apparatus known to those having ordinary skill in the art, the first amplifier 98 and the second amplifier 100 represent an exemplary apparatus for generating ringing signals in accordance with the present invention. In response to a control signal received at the input 108, the first amplifier 98 alternately couples the tip conductor 94 to $V_{BAT}$, the DC voltage supplied by the constant signal source 80, and to ground potential. Similarly, in response to a control signal received at the input 120, the second amplifier 100 alternately couples the ring conductor 96 to $V_{BAT}$ and to ground potential. By selectively reversing polarities between $V_{BAT}$ and ground, the waveform of FIG. 4(a) and the waveform of FIG. 4(b) may be generated.

The potential difference between these two voltages (the waveforms of FIG. 4(a) and FIG. 4(b)) is represented by the waveform of FIG. 4(c)— The waveform of FIG. 4(c) is supplied to the tip and ring conductors 94, 96 as a time varying ringing signal. The waveform of FIG. 4(c) swings between a voltage substantially equal to —VBAT and the absolute value of the battery voltage, +VBAT— The upper and lower limits of the waveform may be limited to less than the battery voltage or its absolute value by, for example, 2.5 volts, which is the saturation limit of the first amplifier 98 and the second amplifier 100. The constant signal source 80 preferably supplies VBAT as a DC voltage in the range –21 volts to –75 volts. Thus, the potential difference between the first time varying signal, conveyed to the tip conductor 94, and the second time varying signal, conveyed to the ring conductor 96, is a time varying signal of at least 90 volts rms. This satisfies industry standards for ringing signals. In accordance with industry standards, ringing signals do not have to be perfect sine waves. For short loop applications, such as fiber in the loop and private area branch exchanges, industry standards require that the crest factor (the peak voltage to rms voltage ratio) of the ringing signal must be greater than 1.2 and less than 1.6. For long loop applications, industry standards require a crest factor greater than 1.35 and less than 1.45. A perfect sine wave has a crest factor of 1.41. Industry standards specifying a crest factor near 1.41 (a pure sine wave) are related to the problem of harmonic signal generation and crosstalk generated in adjacent lines. However, this is a more significant problem for a central office telephone system, as illustrated in FIG. 1, than for FITL applications, since central office applications have many subscriber lines running together in a cable bundling over a long distance. FITL applications, on the other hand, run short distances and are distributed so that fewer cables are bundled together. Moreover, the apparatus of the present invention uses much lower ringing signal voltages than the prior art central office system illustrated in FIG. 1, so less coupling of noise will occur between subscriber lines. Still further, an apparatus in accordance with the present invention uses differential or balanced ringing as opposed to single-ended or unbalanced ringing. In unbalanced ringing, either the tip conductor or the ring conductor is coupled to ground and the entire ringing signal, including any DC offset, is provided to the other conductor. In balanced ringing, a portion of the ringing signal, preferably one-half the total amplitude of the ringing signal, is applied to each conductor, tip and ring.

Balanced ringing generates much less crosstalk than unbalanced ringing since, with balanced ringing, both conductors each have one-half the AC signal and they tend to cancel the coupling effects of each other on a first order level. Therefore, a crest factor close to 1.2 is acceptable for FITL applications, and a ringing generator for FITL applications need not generate a pure sine wave. A trapezoid wave, as illustrated in FIG. 4(c), has a crest factor less than 1.41 and close to 1.2.

Use of a square wave or trapezoid wave, which has more energy than a sine wave of the same frequency, allows use of lower peak amplitude ringing signals. This means the ringing signals may be generated by the same silicon integrated circuit used to provide logic and control functions. Thus, the ringing generator 88 and the control circuit 86 may be combined on a single integrated circuit powered by a single battery voltage.

To increase the crest factor of the signals supplied to the tip conductor 94 and the ring conductor 96, the ringing generator 88 may include filter circuits between the output 112 of the first amplifier 98 and the tip conductor 94 and between the output 124 and the ring conductor 96 (not shown in FIG. 3). Such filter circuits would filter out unwanted harmonic frequencies to produce ringing signals more closely approximating a pure sine wave. However, as indicated above, the trapezoid wave produced by the amplifier 98 and the amplifier 100 should be adequate for most applications, including FITL applications, while avoiding additional costs of the components required to include one or more filter circuits in the ringing generator 88. Preferably, the characteristics of the trapezoid wave produced by the amplifiers 98, 100, such as rise and fall times and peak to peak amplitudes, are controllable from external to the subscriber line interface circuit 23.

Referring again to FIG. 3, the impedance detector 90 includes a first current detector 150, a second current detector 152, a filter 154, a ring trip detector 156 and a DC offset circuit 158. The impedance detector 90 detects the AC impedance between the tip conductor 94 and the ring conductor 96 in the presence of the ringing signal generated by the ringing generator 88. The impedance detector 90 thus forms a detect means for detecting an impedance of the subscriber line in the presence of a time varying ringing signal and providing a ring trip indication when the impedance is below a predetermined impedance threshold.

While any apparatus known in the art for detecting an AC impedance may be employed, the impedance detector 90 illustrated in FIG. 3 is an exemplary impedance detector in accordance with the present invention. The first current detector 150 includes an input 160 for detecting the current supplied by the amplifier 98 to the tip conductor 94. The first current detector 150 rectifies the current detected at the input 160 and provides a signal representative of the rectified current to an output 164. The second current detector 152 includes an input 162 for detecting the current supplied by the amplifier 100 to the ring conductor 96. The second current detector 152 rectifies the current detected at the input 162 and provides a signal representative of the rectified current at the output 166. The signals at the outputs 164, 166 are combined to produce a rectified net current which is provided to the filter 154. The filter 154 includes a resistor 170 and a capacitor 172 for filtering unwanted frequency components of the combined signal. The DC offset circuit 158 includes a resistor 174 coupled to the constant signal source 80 for receiving the battery voltage, $V_{BAT}$. The DC offset circuit 158 adds a DC offset to the combined signal representative of the rectified current and the result is provided to an input 168 of the ring trip detector 156.

The ring trip detector 156 preferably includes a comparator 183 for comparing the value received at the input 168 with a predetermined threshold supplied at an input 176. The ring trip detector 156 has an output 178 coupled to an input 180 of the control circuit 86. When the signal received at the input 168 of the ring trip detector 156 exceeds the predetermined threshold, indicating the currents supplied to the tip conductor 94 and the ring conductor 96 have increased due to the reduction in AC impedance as the subscriber telephone device coupled with the subscriber line 72 is taken off hook, the ring trip detector 156 provides a ring trip indication at the output 178 to the input 180 of the control circuit 86. In response to the ring trip indication, the control circuit 86 interrupts the control signals supplied at the outputs 110 and 122. In response to the interrupt of the control signal, the first amplifier 98 and the second amplifier 100 interrupt the ringing, signals supplied to the tip conductor 94 and the ring conductor 96.

Preferably, the ringing generator 88, the impedance detector 90 and the subscriber line interface 92 are integrated on a common integrated circuit 181. In addition, the control circuit 86 may also be integrated on the common integrated circuit 86.

Figure 5:
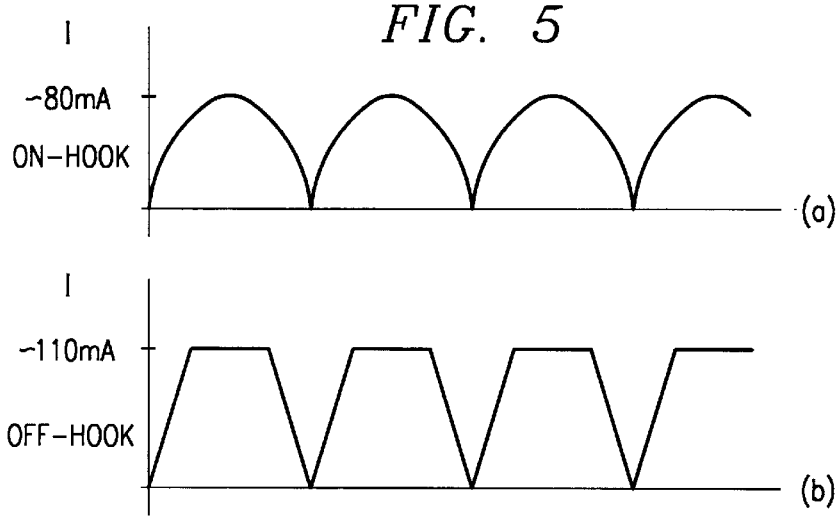
FIG. 5 is a diagram illustrating ringing signal current waveforms detected by the apparatus of FIG. 3.

FIG. 5 is a diagram of ringing signal current waveforms detected by the apparatus of FIG. 3. FIG. 5(a) illustrates the rectified current waveform detected by the impedance detector 90 when ringing signals are supplied by the ringing generator 88 to a subscriber line coupled to a subscriber telephone device in the on hook state. As illustrated in FIG. 5(a), the detected, rectified current waveform is generally a sinusoid having peak value of approximately 45 mA. FIG. 5(b) represents the rectified current waveform detected by the impedance detector 90 when ringing signals are supplied to a subscriber line coupled to a subscriber telephone device in the off hook state. As can be seen in FIG. 5 (b), the rectified current waveform has the form of a trapezoid wave having a peak value of approximately 110 mA. The difference between the peak values of the waveforms illustrated in FIGS. 5(a) and 5(b) is sufficient to allow accurate detection of a change in the AC impedance of a subscriber line coupled to the ringing generator and thus allow accurate on hook detection.

Figure 6:
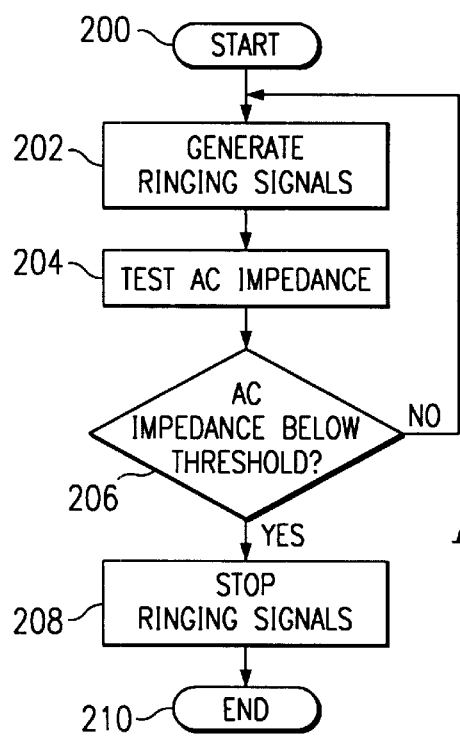
FIG. 6 is a flow diagram illustrating the preferred embodiment of the method of the present invention.

FIG. 6 is a flow diagram illustrating the preferred embodiment of the method of the present invention. The method begins at step 200. At step 202, ringing signals are provided to a subscriber telephone line which is coupled with a subscriber telephone device. The ringing signals preferably include a first time varying signal and a second time varying signal.

The method continues at step 204, where the AC impedance of the subscriber line is detected. This may be accomplished by any suitable technique known to those of ordinary skill in the art; preferably, the peak current supplied to the subscriber line is detected as described above in connection with FIGS. 3 and 5. When the peak current is supplied at a known time varying voltage, the AC impedance can be determined from the peak current.

At step 206, the AC impedance of the subscriber line in the presence of the ringing signals is compared with a predetermined threshold. If the AC impedance is above the predetermined threshold, it is determined that the subscriber telephone device is on hook. If the detected AC impedance is above the predetermined threshold, the method returns to step 202 and ringing signals continue to be generated. If the detected AC impedance is below the predetermined threshold, it is determined that the subscriber telephone device is on hook and the method continues at step 208, where the ringing signals are interrupted. The method terminates at step 210.

The present invention allows reduction of the DC operating voltage required for a subscriber line interface circuit that is able to ring telephone devices without the use of an external ringing generator and a ring delay. Preferably the telephone lines with which the invention is used are relatively short telephone lines. Short telephone lines have relatively low loop resistance. In FITL (fiber in the loop) applications, loop resistance is less than 100 ohms. This is also true in hybrid fiber coax and other set-up or box-on-the-side-of-the-home applications. In some areas, this loop resistance may increase to a few hundred ohms. Also key telephone systems and some small PABXes (private area branch exchanges) have short loops. One key characteristic of a short loop is that the impedance of the loop plus the off hook impedance of the telephone device (which is less than 430 ohms) is significantly less than the on-hook impedance of the ringing circuit in the telephone set. In the United States, FITL systems specify the maximum ringing load as 5 REN (ringer equivalent number) or about 1400 ohms plus a 40uF capacitor. However, other countries have lighter loads. For example, the United Kingdom specifies a maximum ringing load of 3 REN. Many PABXes only have a 1 or 2 REN requirement. When this short loop criterion is met there are several benefits.

One benefit is that loop detection can be accomplished by looking at the AC impedance or current rather than the DC impedance/current. Therefore, it is possible to reduce or eliminate the DC component of the ringing signal.

A second benefit is that short loop applications can use balanced ringing because they do not have to support multi-party ringing applications. Balanced ringing has two major benefits. First of all, it reduces the DC maximum voltage that is required. An unbalanced ringing system requires that the DC operating voltage be larger than the peak-to-peak value of the AC signal or the peak value of the AC signal, and the DC offset, whichever is greater, while a balanced system requires a DC operating voltage that is greater than the peak AC signal plus the DC offset. If the DC offset is reduced to zero, a balanced system requires about one half of the operating voltage of the peak AC signal of the source voltage. Short loop systems have a much lower source voltage than long loop systems, so the combination of these factors greatly reduces the DC operating voltage requirements. Balanced ringing injects much less crosstalk into adjacent lines due to its balanced nature. In addition, in short loop applications, short loops and lower ringing voltages produce much less coupling than long loops with high ringing voltages. Finally, short loops do not have many other lines running along side the loop so coupling is less of a problem. These factors allow reduction of the crest factor of the ringing signal and use of a trapezoidal waveform as opposed to a sine wave. A 1.25 crest factor (to provide adequate margin if the spec is 1.2 minimum) reduces the peak signal by about 10% relative to a sine wave and reduces the DC operating voltage by another 10%. A trapezoidal waveform generator is much easier and less expensive to implement than a sine wave generator.

The combination of these techniques allows reduction of the operating voltage requirements from almost 300V for a central office-type application down to about 60V for a short loop application. Use of a somewhat higher voltage allows a larger ringing signal or a longer loop to be driven. This voltage range can be supported by low cost, high reliability integrated circuit technologies.

It is to be understood that, while the detailed drawing and specific examples given describe preferred embodiments of the invention, they are for the purpose of illustration, that the apparatus of the invention is not limited to the precise details and conditions disclosed and that various changes may be made therein without departing from the spirit of the invention which is defined by the following claims.

I claim:

1. A method for providing ringing signals to a subscriber telephone device coupled to a subscriber line, the subscriber line including a first conductor and a second conductor, the method comprising the steps of:
   providing a first time varying ringing signal to said first conductor and a second time varying ringing signal to said second conductor;
   detecting only an AC impedance between said first conductor and said second conductor in the presence of said first time varying ringing signal and said second time varying ringing signal; and
   providing a ring trip indication when said AC impedance is below a predetermined threshold.

2. A method for providing ringing signals to a subscriber telephone apparatus coupled to a subscriber line as recited in claim 1 wherein the method further comprises the step of interrupting said first time varying ringing signal and said second time varying ringing signal in response to said ring trip indication.

3. A method for providing ringing signals to a subscriber telephone apparatus coupled to a subscriber line as recited in claim 1 wherein the method further comprises the steps of selectively providing a DC voltage to said first conductor and to said second conductor to generate said first time varying ringing signal and said second time varying ringing signal.

4. A method for providing ringing signals to a subscriber telephone apparatus coupled to a subscriber line, the subscriber line including a first conductor and a second conductor, wherein the method comprises the steps of:
   providing a first time varying ringing signal to said first conductor and a second time varying ringing signal to said second conductor;
   detecting only an AC impedance between said first conductor and said second conductor in the presence of said first time varying ringing signal and said second time varying ringing signal;
   providing a ring trip indication when said AC impedance is below a predetermined threshold;
   interrupting said first time varying ringing signal and said second time varying ringing signal in response to said ring trip indication;
   providing said DC voltage to said first conductor with a first polarity and providing said DC voltage to said second conductor with a second polarity during a first phase; and
   providing said DC voltage to said first conductor with said second polarity and providing said DC voltage to said second conductor with said first polarity during a second phase, said second polarity being opposite said first polarity.

5. A method for providing ringing signals to a subscriber telephone apparatus coupled to a subscriber line, the subscriber line including a first conductor and a second conductor, wherein the method comprises the steps of:
   providing a first time varying ringing signal to said first conductor and a second time varying ringing signal to said second conductor;
   detecting only an AC impedance between said first conductor and said second conductor in the presence of said first time varying ringing signal and said second time varying ringing signal;
   providing a ring trip indication when said AC impedance is below a predetermined threshold;
   interrupting said first time varying ringing signal and said second time varying ringing signal in response to said ring trip indication;
   providing said DC voltage to said first conductor with a first polarity and providing said DC voltage to said second conductor with a second polarity during a first phase;
   providing said DC voltage to said first conductor with said second polarity and providing said DC voltage to said second conductor with said first polarity during a second phase, said second polarity being opposite said first polarity; and
   providing a non-zero time interval between said first phase and said second phase and switching between said first polarity and said second polarity during said non-zero time interval.

6. A method for providing ringing signals to a subscriber telephone apparatus coupled to a subscriber line, the subscriber line including a first conductor and a second conductor, wherein the method comprises the steps of:
   providing a first time varying ringing signal to said first conductor and a second time varying ringing signal to said second conductor;
   detecting only an AC impedance between said first conductor and said second conductor in the presence of said first time varying ringing signal and said second time varying ringing signal;
   providing a ring trip indication when said AC impedance is below a predetermined threshold;
   detecting a first time varying current in said first conductor and a second time varying current in said second conductor;
   rectifying said first time varying current and said second time varying current;
   combining said rectified first time varying current and said rectified second time varying current to produce a rectified net current; and
   providing said ring trip indication when said rectified net current exceeds a predetermined current threshold.

7. A method for providing ringing signals to a subscriber telephone apparatus coupled to a subscriber line, the subscriber line including a first conductor and a second conductor, wherein the method comprises the steps of:

providing a first time varying ringing signal to said first conductor and a second time varying ringing signal to said second conductor;

detecting only an AC impedance between said first conductor and said second conductor in the presence of said first time varying ringing signal and said second time varying ringing signal;

providing a ring trip indication when said AC impedance is below a predetermined threshold;

detecting a first current amplitude in said first conductor and a second current amplitude in said second conductor; and providing said ring trip indication when said first current amplitude and said second current amplitude exceed a predetermined current threshold.

8. A method for providing ringing signals to a subscriber telephone apparatus coupled to a subscriber line, the subscriber line including a first conductor and a second conductor, wherein the method comprises the steps of:

providing a first time varying ringing signal to said first conductor and a second time varying ringing signal to said second conductor;

detecting only an AC impedance between said first conductor and said second conductor in the presence of said first time varying ringing signal and said second time varying ringing signal;

providing a ring trip indication when said AC impedance is below a predetermined threshold;

detecting a first current amplitude in said first conductor and a second current amplitude in said second conductor;

providing said ring trip indication when said first current amplitude and said second current amplitude exceed a predetermined current threshold;

detecting a first peak value of said first current amplitude and a second peak value of said second current amplitude;

combining said first peak value and said second peak value; and providing said ring trip indication when said sum exceeds a predetermined current sum threshold.

9. A method for providing ringing signals to a subscriber telephone apparatus coupled to a subscriber line, the subscriber line including a first conductor and a second conductor, wherein the method comprises the steps of:

providing a first time varying ringing signal to said first conductor and a second time varying ringing signal to said second conductor;

detecting only an AC impedance between said first conductor and said second conductor in the presence of said first time varying ringing signal and said second time varying ringing signal;

providing a ring trip indication when said AC impedance is below a predetermined threshold;

detecting a current in said subscriber line; and rectifying said current and providing said ring trip indication when said rectified current exceeds a predetermined current threshold.

* * * * *